United States Patent
Walkling et al.

(10) Patent No.: US 8,583,359 B2
(45) Date of Patent: Nov. 12, 2013

(54) METHOD FOR THE INPUT OF A DESTINATION AND NAVIGATION DEVICE

(75) Inventors: Uwe Walkling, Barfelde (DE); Marco Fiedler, Diekholzen (DE); Henry Brandes, Woelpinghausen (DE); Holger Listle, Hildesheim (DE); Ralf Osmers, Hildesheim (DE); Thomas Klein, Alfeld (DE); Joerg Krewer, Pattensen (DE); Stefan Lueer, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 423 days.

(21) Appl. No.: 12/302,336

(22) PCT Filed: Jun. 28, 2007

(86) PCT No.: PCT/EP2007/056481
§ 371 (c)(1),
(2), (4) Date: Mar. 27, 2009

(87) PCT Pub. No.: WO2008/019908
PCT Pub. Date: Feb. 21, 2008

(65) Prior Publication Data
US 2009/0234566 A1 Sep. 17, 2009

(30) Foreign Application Priority Data
Aug. 17, 2006 (DE) .......................... 10 2006 038 550

(51) Int. Cl.
*G01C 21/00* (2006.01)
(52) U.S. Cl.
USPC ....... 701/400; 715/713; 701/409; 340/995.19

(58) Field of Classification Search
USPC ........... 707/104.1; 340/995.19; 701/208, 400, 701/409; 715/713
See application file for complete search history.

(56) References Cited

U.S. PATENT DOCUMENTS

| 5,887,269 A | * | 3/1999 | Brunts et al. | 701/208 |
| 6,484,094 B1 | | 11/2002 | Wako | |
| 7,536,416 B2 | * | 5/2009 | Abe | 1/1 |
| 7,716,582 B2 | * | 5/2010 | Mueller | 715/713 |
| 7,889,101 B2 | * | 2/2011 | Yokota | 340/995.19 |

FOREIGN PATENT DOCUMENTS

EP  0 704 675  4/1996

OTHER PUBLICATIONS

Google patents search history, May 28, 2013.*
International Search Report, PCT/EP2007/056481, dated Oct. 15, 2007.

* cited by examiner

*Primary Examiner* — Dilek B Cobanoglu
(74) *Attorney, Agent, or Firm* — Kenyon & Kenyon LLP

(57) ABSTRACT

In a method for the input of a destination, first of all a category selection is made, destinations corresponding to the category selection subsequently being offered for selection, at least a portion of the destinations being assigned to at least one subordinate category that, in each instance, has a superordinate category, characterized in that a category selection is made such that in each case, a superordinate category is displayed for the category selection or the superordinate category is replaced by one or the plurality of categories subordinate to it, and in each instance, a replacement is made when the number of subordinate categories with respect to a superordinate category is less than a predefined first threshold value.

10 Claims, 3 Drawing Sheets

METHOD FOR THE INPUT OF A DESTINATION AND NAVIGATION DEVICE

FIELD OF THE INVENTION

The present invention is directed to a method for the input of a destination and to a navigation device.

BACKGROUND INFORMATION

U.S. Pat. No. 6,484,094 has already described a device and a method for the input of a destination for a navigation system, in which a user is able to select particular destinations. To permit a faster input, categories of particular destinations and subcategories are provided. In that case, the user is able to select a suitable category within a list, and after a category has been chosen, one or more corresponding destinations are displayed to him for selection.

SUMMARY

In contrast, the method according to example embodiments of the present invention for the input of a destination has the advantage that the selection of a category can be accelerated, since a category selection is able to be adapted dynamically to the categories actually available. Because a superordinate category is replaced by one or more subordinate categories in a selection, a possibly unnecessary selection step, which includes first of all the selection of a superordinate category and subsequently the selection of a subordinate category, is avoided. In this context, preferably a threshold value is provided, so that either according to specification by the manufacturer or possibly also according to the desire of a user, it can be determined when the subcategories will replace the superordinate category, or when the superordinate category will actually be displayed first for a selection.

Moreover, it is especially advantageous to implement the method in a computer-controlled navigation device, since thus particularly in respect to a vehicle, a rapid selection of a destination is able to be provided to a driver via a previously stored category selection according to example embodiments of the invention. In particular, the input of a destination is thereby accelerated in the vehicle.

It is particularly advantageous to first of all select a location or a region, so that upon selection of a destination, only those categories are considered for which at least one destination even exists in the selected region. Superordinate categories can probably be replaced more frequently by subordinate categories in the case of a limited region because of the smaller size and the smaller number of destinations associated with it. Particularly in the case of smaller regions and locations, the selection of superordinate categories offered may thereby be reduced sharply, so that category selection and thus the input of the destination are accelerated.

Furthermore, it is advantageous that, in addition to a superordinate category, a selection having a complete list of all destinations subordinate to the respective superordinate category is offered for choice. In the event the assignment of a destination to one of the subcategories is unclear to a user, the user is able to select the specific destination directly from the complete list without first having to determine a subordinate category. This is particularly advantageous when a user is not yet familiar with a system, when a user does not understand the man-machine language well, or when an assignment to the subcategories could possibly be ambiguous.

Moreover, it is advantageous that, for the selection, a superordinate category is suitably replaced by one or more subordinate categories not only in a first hierarchy level, but rather that a suitable replacement may also extend over several hierarchy levels. In this context, it is particularly advantageous if a superordinate category is able to be replaced not only by a category of the next subordinate hierarchy level, but rather that a replacement by a category from a further, lower subordinate category group is also possible. In this connection, it is especially advantageous that the total number of subordinate categories, including the lower categories, in the display is limited by a second threshold value. For instance, it is thereby possible to limit the display of the total categories shown to one side of a display screen.

In order to adapt a display of categories to the desires of a user, it is advantageously provided for the threshold value to be changeable by a user.

Exemplary embodiments of the present invention are illustrated in the drawing and explained in greater detail in the following description.

DETAILED DESCRIPTION

The method of example embodiments of the present invention for the input of a destination may be used for any navigation devices which calculate a route from a starting point to a destination. Use in a vehicle is particularly advantageous, since when utilized in the vehicle, a desired destination should be input as quickly as possible from the point of view of the driver, since the destination should only be input when the vehicle is at standstill. Therefore, in the following, an example embodiment of the present invention is explained using a navigation device in a motor vehicle as example.

Figure 1:
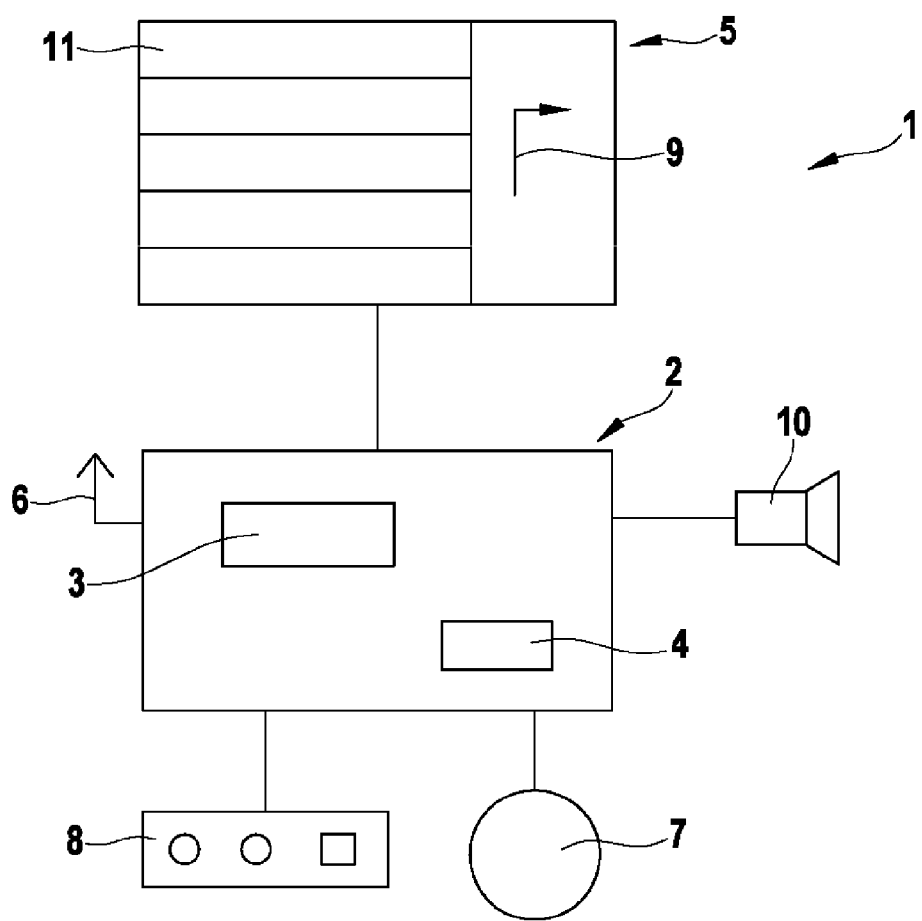
FIG. 1 illustrates a navigation device according to an example embodiment of the present invention.

FIG. 1 shows a navigation device 1 which is permanently or removably disposed in a vehicle. Navigation device 1 has a central processing unit 2 provided with an arithmetic logic unit 3 and a preferably non-volatile memory 4. A display 5 is connected to central processing unit 2.

For example, display 5 is in the form of a liquid-crystal display and is disposed in a center console or in an area of an instrument panel of the motor vehicle. Central processing unit 2 is also connected to an antenna unit 6 for fixing the vehicle position. For example, antenna unit 6 is used for satellite-based position finding. In that context, a position of the vehicle is determined by arithmetic logic unit 3, utilizing the position determined via antenna unit 6 accompanied by access to a digital roadmap 7, which is stored in a memory element that preferably is likewise non-volatile. A user is able to input a destination into navigation device 1 via an operating unit 8. Taking into account the current position determined via antenna unit 6, arithmetic logic unit 3 calculates a route to the indicated destination while accessing digital map 7. For example, driving instructions may be output in the form of a direction arrow 9 in display unit 5. Alternatively or additionally, driving instructions may also be output via an acoustical output unit 10. A program for calculating routes is preferably stored in memory 4. A method for the input of destinations is also stored in memory 4. To that end, destination categories and destinations are displayed to a user in display unit 5. By a selection of the displayed categories or destinations in input fields 11, a user is able to first of all select a category in order, after the category is selected, to be offered a choice of destinations limited by the category selection. From this offering of destinations limited by the category selection, a destination may now be selected. The control is accomplished via operating unit 8 or via a display unit 5 in the form of a touchscreen operating unit. In addition to a subsequently explained input of a destination via a previously made selection of the destination according to categories, it is also possible to input the destination by specifying an address or by positioning in a map.

In the following, the input of a destination is explained with reference to FIG. 2, the destination being selected according to categories. In so doing, first of all a superordinate category is selected. For example, for the selection, several categories are indicated to the user in selection fields in a display; a category may be selected by choosing the selection field assigned to it, by an input, e.g., via operating unit 8. This may be followed by the selection of a category subordinate to the superordinate category. Assigned to this subordinate category are either further categories subordinate to it, or destinations directly. The selection is continued via the determination of categories until a user selects one particular subordinate category to which, in turn, only destinations are assigned. These destinations are subsequently displayed to the user for selection. For example, the destinations may be chosen from a list arranged alphabetically or according to a distance from the current vehicle position.

The method begins starting from an initialization step 20, e.g., the switching-on of a navigation device 1 in a vehicle. In a first input step 21, a user selects the input method. In a subsequent first check step 22, it is checked whether a user wants to input a destination via a category selection. If this is not the case since, for instance, the driver wants to select an input via a destination-map positioning, an address input, or via a selection from the list of the last destinations, the method then branches to input step 23, in which alternative methods, not described here, are carried out for the input of a destination. In the event a user wants to select a destination via a choice of destination categories, the method branches further to ascertainment step 24, in which first of all the topmost level of selectable categories is determined by arithmetic logic unit 3.

In order to be able to implement a suitable category selection, digital map 7 includes destinations which, in each case, are associated with category information. The categories may be subdivided into superordinate categories such as "leisure timer", for instance, and subordinate categories with respect to the theme of the superordinate category. For example, categories subordinate to the category "leisure time" may be the categories "restaurants" or "sports facilities". The superordinate and subordinate categories may be arranged hierarchically according to a tree structure. At the same time, it is also possible to assign individual destinations to several categories. Several entries in the hierarchical tree structure may also then be assigned to the destination. In a further specific embodiment, it is also possible that the destinations in the navigation database of map 7 are in each case assigned directly to only one subordinate category.

In an example embodiment, superordinate categories have no direct assignment to destinations. Only the last elements in the category tree in each instance have an assignment to destinations. In order to create a selection menu to be output to a user, a further database is stored in which the make-up of the subordinate categories is stored, each of which is subordinate to a superordinate element. In doing this, the make-up may be stored for each category which has one or more subordinate categories, so that the hierarchical order of the superordinate and the subordinate categories is yielded from the database for the category groups. In an example embodiment, a list structure is provided for this purpose in which a heading element of the list contains the designation of the superordinate category, followed by the subordinate categories, each of which is subordinate to the superordinate category. In this case, a plurality of hierarchy levels could also be mapped. In so doing, a data file may be provided for each category with subordinate categories. For example, storage may be accomplished according to the table shown below. The categories shown here are represented by way of example. Additional or other categories may also be stored, depending on the particular arrangement.

| POI | Leisure time | Transportation | All POIs | |
|---|---|---|---|---|
| All POIs | Airport | Restaurant | Railroad station | Parking |
| | Tennis court | Football stadium | Garage | Gas station |
| Leisure time | Restaurant | Sports facility | All leisure time | |
| All leisure time | Restaurant | Football stadium | Tennis court | |
| Transportation | Airport | Railroad station | Parking | Gas station |
| | Garage | All transportation | | |
| All transportation | Airport | Railroad station | Parking | Gas station |
| | Garage | | | |
| Sports facility | Football stadium | Tennis court | All sports facilities | |
| All sports facilities | Football stadium | Tennis court | | |

In each case, the heading elements are indicated in the first column. In the following columns, those categories are indicated which are directly subordinate to the category indicated in the heading element. In the following, several of the assignments shown in the table are explained by way of example. The highest hierarchy level is indicated by the list "pOI". Under this are the subordinate categories "leisure time" and "transportation". The selection "all POIs" (POI=point of interest) is also offered as additional choice.

Given the selection of the category "All . . . ", all subordinate categories of the lowest hierarchy level offered with respect to the category following "All . . . " to which destinations are directly assigned are offered. If one of these categories is selected, in a following step, destinations, e.g., one or more airports, one or more restaurants, one or more railroad stations, etc., are displayed. The rows beginning with "All . . . " do not have to be stored explicitly, but rather may also be generated from the rows not marked, if necessary, may be generated by calculation. In the present example, given the selection of the category "All POIs", the subordinate categories with respect to the quantity of all POIs are offered, namely "airport", "restaurant", "railroad station", "parking", "tennis court", "football stadium", "garage", "gas station".

In response to the selection of the category "leisure time", the subordinate categories "restaurant", "all leisure time" and "sports facility" are offered. If now in turn "all leisure time"

is selected, then in the same way as for the category "all POIs", the categories "restaurant", "football stadium", "tennis court" are offered.

In an example embodiment, directly after the selection of the category "all POIs", a list having all destinations of the subordinate categories "airport", "restaurant", "railroad station", "parking", "tennis court", "football stadium", "garage", "gas station" may be displayed, and analogous to that, after the selection of the category "all leisure time", a list may be displayed having all destinations of the subordinate categories "restaurant", "football stadium", "tennis court". In an example embodiment, it is also possible to dispense with the selection lists introduced by "all . . . ", and to allow only a hierarchical selection.

Figure 3:
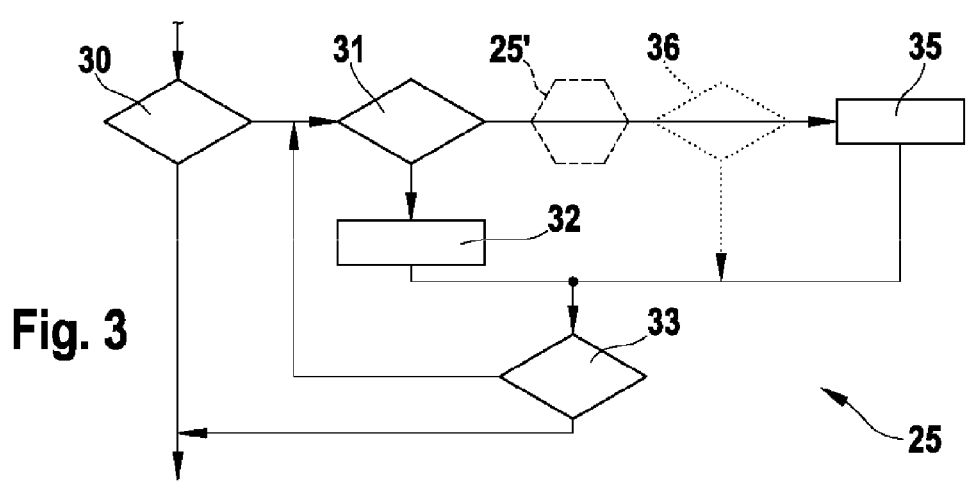
FIG. 3 illustrates a detail of the method of an example embodiment of the present invention for the input of a destination according to FIG. 2.

If a user has now selected the input of a destination via the input of categories, the method then branches from ascertainment step 24 to a display selection step 25, which is illustrated in detail in FIG. 3.

In the present exemplary embodiment, a category is intended to be offered to a driver only when at least one selectable destination exists for this category or for at least one subordinate category possibly available. Thus, it is possible that a category is indeed provided in a data record of digital map 7, however no destination exists for this category in the region of the digital map. Preferably, however, the corresponding region may also be narrowed down by a user input. So, for example, at input step 21, a user is able to input a city desired by him or another region desired by him, e.g., a state or a rural district. Alternately, such a region may also be described by a circle having a defined radius of 50 km, for instance, around the current vehicle position. A display of a category for selection, both of subordinate and of superordinate categories, is only carried out when a destination also exists for this category in the corresponding selected region.

In a second check step 30, it is checked whether at least one element of the topmost category level has a subordinate category. In this context, to be understood by the term "has a subordinate category" is that at least one subordinate category exists which is either itself assigned a destination, or which, in turn, at any depth of the hierarchy, has at least one category that in turn is subordinate to it and to which at least one destination is assigned. If no category of the topmost category level has such a subordinate category, then display selection step 25 is ended.

Figure 2:
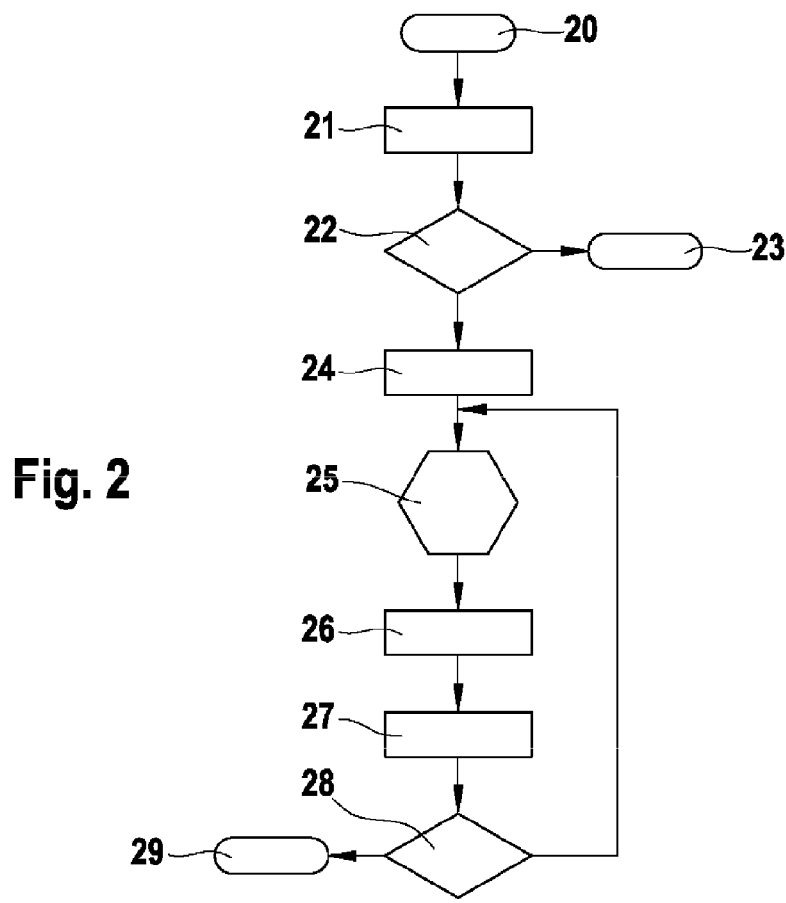
FIG. 2 illustrates a method of an example embodiment of the present invention for the input of a destination.

In the present case, the method now further branches directly to a display step 26, which is shown in FIG. 2. In this case, in display step 2G, the topmost category level is displayed directly to the user for selection, provided destinations are assigned to it. In a selection step 27 following display step 26, the observer now makes a selection from the categories offered to him for selection. In a subsequent third check step 28, it is checked whether a user has selected a category that itself again has at least one subordinate category. In this case, the method branches back to display selection step 25, and the method described on the basis of FIG. 3 is carried out again for the category subtree now remaining. On the other hand, if it is determined in third check step 28 that the selected category has no subordinate categories, but rather only assigned destinations, the method then branches to an input step 29 in which a user is able to select from a list of displayed destinations which, for example, are indicated by a name designation. Thus, for example, the names of various railroad stations or various restaurants may be indicated. Furthermore, additional information such as an address may also be displayed in the selection. If a displayed destination is selected by the driver, then—possibly after a further confirmation—a route to the selected destination is determined by arithmetic logic unit 3.

On the other hand, if it is determined in second check step 30 according to FIG. 3 that at least one of the categories of the topmost hierarchy level is assigned to a subordinate category, the method then branches to a fourth check step 31. In fourth check step 31, the number of subordinate categories for the first of the superordinate categories is ascertained. For example, in the case of the category "transportation" already explained above, they would be the five categories "airport", "railroad station", "parking", "gas station", "garage". Preferably, the selection possibilities beginning with "all . . . " are not included in the counting. Thus, in the present example, the selection "all transportation", in which in turn a list selection of the subordinate categories or destinations is given, is not calculated in. In this context, for a count in an example embodiment, the subordinate categories present on the data carrier in the data structure are considered in the count. In an example embodiment, a subordinate category is taken into consideration in ascertaining the number when and only when at least one destination is assigned to this category or at least to a category subordinate to it. This is the case when, in the entire digital map or for the case that a specific region was determined for the selection beforehand, a destination belonging to this category exists in the digital map or in the determined region.

In fourth check step 31, the number ascertained is compared to a threshold value. However, instead of performing a calculation, the number of subordinate categories may also already be determined beforehand and stored, e.g., for a specific location, for a data carrier having a digital map, or for a region otherwise determined.

If the ascertained number of subordinate categories is greater than the threshold value, then in a subsequent first determination step 32, it is determined that the superordinate category, thus, e.g., the category "transportation", is offered for selection to the user. The method subsequently branches to a fifth check step 33, in which it is checked whether yet another category of the topmost hierarchy level has a subordinate category. If this is not the case, display selection step 25 is ended, and the method further branches to display step 26.

On the other hand, if it is determined in fifth check step 33 that all superordinate category groups were not yet checked, the method then branches back to fourth check step 31, in order to check the next superordinate category group.

If it is determined in fourth check step 31 that the number ascertained is less than the predefined threshold value, the method further branches to a second determination step 35. In second determination step 35, the superordinate category is replaced by the categories subordinate to it for a subsequent display. In display step 26 following later, instead of the superordinate category, the categories subordinate to it are then displayed. The method then further branches to fifth check step 33.

In a large city, it must be expected that at least one destination exists for each of the categories "airport", "railroad station", "parking", "gas station", "garage". For example, if the threshold value is three, then in such a case, the superordinate category "transportation" would continue to be displayed to a user in a first selection, since five categories, to which in each case at least one destination is assigned, are subordinate to the category "transportation".

For example, a smaller community may have no airport, no railroad station and no garage, but perhaps three parking lots and two gas stations. If the threshold value is set to three here, as well, then the ascertainment of the categories for which destinations exist yields the value two, namely "parking" and "gas station". Therefore, instead of the superordinate category "transportation", the subordinate categories "parking" and "gas station" are now output directly to the user in the display step. So, for example, the menu display, which is determined in display selection step 25, could read: "leisure time" (here, for example, no replacement), "parking", "gas station" (both replace the category "transportation"), "all POIs" (unchanged).

In an example embodiment, in each case a replacement may only be made by categories of the next hierarchy level, thus, for example, in the present exemplary embodiment, "parking" and "gas station" instead of the superordinate category "transportation". Furthermore, it is also possible, however, that the hierarchical structure is continued over several levels. So, for example, the category "sports facility" is subordinate to the superordinate category "leisure time", while in turn, the categories "football stadium" and "tennis court" are subordinate to the category "sports facility". For example, if except for just one tennis court, there are no other leisure-time possibilities in a community, then the category "tennis court" could replace not only the category "sports facility", but also the superordinate category "leisure time". The reason is that only one category, namely, the category "sports facility" is then subordinate to the category "leisure time". However, only the category "tennis court" is subordinate to the category "sports facility".

In order to implement an example embodiment in which, correspondingly, categories subordinate to more than one hierarchy level replace a category superordinate to it, display-selection step 25, denoted as 25' in FIG. 3, is inserted recursively before second determination step 35. This is represented by the broken lines in FIG. 3. Thus, the categories of the subordinate hierarchy level are now each also checked as to whether a replacement should be made. In this case, as well, a replacement is made when the number of subordinate categories does not exceed the threshold value. So, given a threshold value of three, in the case of the example of the tennis court as the single leisure-time possibility indicated above, after the decision to replace "leisure time" by "sports facilities", display-selection step 25 is also used on the superordinate category "sports facilities". However, it has only one category, namely, "tennis court", to which a destination is assigned. Therefore, the number is smaller than the threshold value of three, so that this replacement is carried out, as well.

Consequently, the category "sports facilities" is replaced by the category "tennis court". Thus, in the present exemplary embodiment, the category "leisure time" is replaced by the category "tennis court" in the display for the category selection.

Particularly in the case of this example embodiment, it may happen that because of several replacements over several hierarchy levels, the number of selectable categories which are displayed will increase. Therefore, in a further example embodiment, a further sixth check step 36, shown with dotted lines, is inserted before second determination step 35. In this case, the total number of categories to be displayed is determined, taking into account the unreplaced categories yet following and the replacements possibly already made, as well as the replacements possibly to be made owing to second determination step 35. If, in this context, a predefined second threshold value is exceeded, then second determination step 35 is skipped, and no further replacement is made. If the second threshold value is not exceeded, then second determination step 35 is carried out. For example, the second threshold value may be selected in such a way that it represents the maximum number of selection boxes for the category selection able to be displayed simultaneously on one screen side of display 5, e.g., eight selection fields.

On one hand, the first and/or the second threshold value may be stored in nonvolatile memory unit 4 of navigation device 1. Furthermore, however, one or both threshold values may also be changed by the user via operating unit 8.

Figure 4:
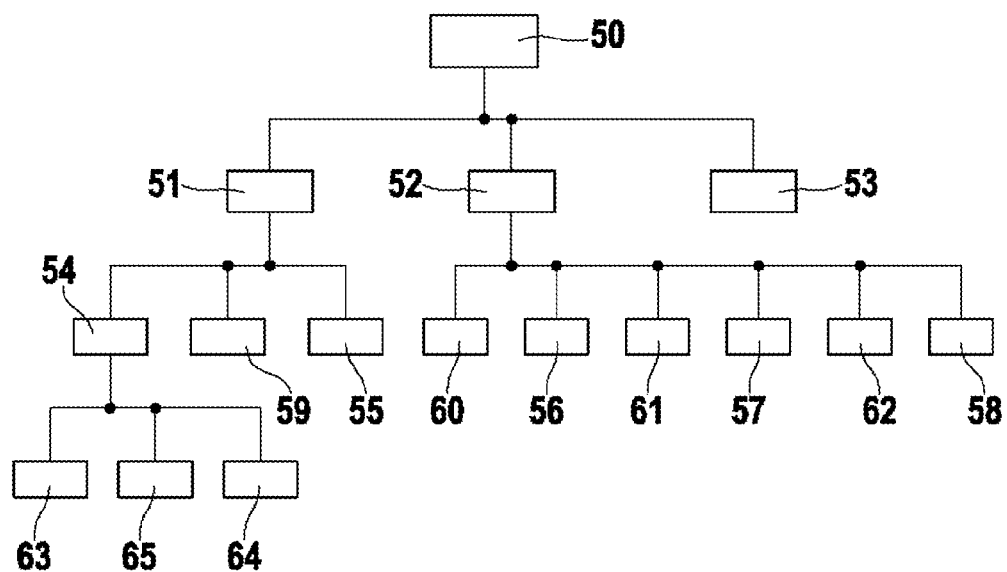
FIG. 4 illustrates the process of selection of type of destination category and leisure time of an example embodiment of the present invention.

FIG. 4 again shows the representation of the individual categories in a category tree. In so doing, the following markings designate the respective category entries: POI 50, leisure time 51, transportation 52, all POIs 53, sports facility 54, all leisure time 55, gas station 56, railroad station 57, all transportation 58, restaurant 59, parking 60, garage 61, airport 62, football stadium 63, all sports facilities 64, tennis court 65.

For example, if a user now wants to stop at a tennis court, and he is in a large city, then it must be assumed that at least one destination is assigned to all categories of the lowest level. If a user now makes the selection POI, then given a threshold value of two, initially the following list is displayed to him: leisure time 51, transportation 52, all POIs 53. If he now selects leisure time 55, the following is displayed to him: sports facility 54, restaurant 59, all leisure time 55. If from this list, he now selects the category sports facility 54, displayed in the following list are: football stadium 63, tennis court 65, all sports facilities 64. If he now selects tennis court 65, then in the following, a list of all tennis courts in the city is displayed to him, from which he may now choose one for the selection as destination. If the input is made in a small town in which there is only one tennis court and no further points of interest, then the selection tennis court 65 is displayed directly in the topmost level. He may now select the category tennis court 65, and then select one or more tennis courts accordingly.

Given a threshold value of three, in the large city, the input would change in the manner hereof as follows. First of all, as before, the selection leisure time 51, transportation 52, all POIs 53 would be displayed to the user. If he now selects leisure time 51, the selection sports facilities 54 is replaced by the selection football stadium 63 and tennis court 65. The reason is that there are only two subcategories for sports facilities 54. Therefore, the list football stadium 63, tennis court 65, restaurant 59, all leisure time 55 is displayed to the user. The user is now able to select the category tennis court 65 directly.

If four is predefined as the first threshold value, then football stadium 63, tennis court 65, restaurant 59, transportation 52, all POIs 53 are already displayed in the topmost level. The reason is that in this case, the category selection leisure time 51 is also replaced by its subordinate category groups. For instance, if a first threshold value of six were selected, then the selection football stadium 63, tennis court 65, restaurant 59, parking 60, gas station 56, garage 61, railroad station 57, airport 62, all POIs 53 would be displayed to a user. In this case, all superordinate category groups are replaced, since no category group has more than six subordinate categories.

What is claimed is:

1. A method for inputting a destination, comprising:
for a hierarchical set of items that includes (a) a plurality of superordinate categories, and (b), for each of at least one of the superordinate categories, at least one respective subordinate element that is at a hierarchical level immediately below the respective superordinate category, performing the following:
for each of the at least one of the superordinate categories, conditional upon that the at least one respective subordinate element, that is of the respective superordinate category and that is at the hierarchical level immediately below the respective superordinate category, does not include more than a predefined first threshold number of subordinate elements, replacing the respective superordinate category with its at least one respective subordinate element that is at the hierarchical level immediately below the respective superordinate category, wherein the subordinate elements replacing their respective superordinate category are selectable destinations; and subsequently, in response to a selection of a category of the hierarchical set of items, which selected category is an immediate superordinate of at least one of the superordinate categories for which the replacement was performed, displaying the selectable destinations that replaced the at least one of the superordinate categories instead of the at least one of the superordinate categories.

2. The method according to claim 1, wherein at least one of (a) a location and (b) a region is selected beforehand, and the number of subordinate categories for a superordinate category is determined for at least one of (a) a respective location and (b) a respective region.

3. The method according to claim 1, wherein a subordinate category is taken into consideration when determining the number of subordinate categories only in the event that at least one destination is assigned to one of (a) the category and (b) at least to a category subordinate to it.

4. The method according to claim 1, wherein in addition to a superordinate category, a complete list of all categories that are subordinate to the superordinate category and to which in each case at least one destination is assigned, is offered for selection.

5. The method according to claim 1, wherein in addition to a superordinate category group, a complete list of all destinations that belong to one of the categories subordinate to superordinate category groups is offered for selection.

6. The method according to claim 1, wherein a second threshold value is determined for an entirety of the categories to be displayed for selection, and a replacement of superordinate categories by categories subordinate to them is ended when the predefined threshold value would be exceeded by a further replacement.

7. The method according to claim 6, wherein at least one of (a) the first and (b) the second threshold value is altered by a user.

8. The method according to claim 1, wherein the replacing includes moving the respective at least one subordinate element to a hierarchical level of the respective superordinate category being replaced.

9. The method according to claim 1, wherein the displaying includes positioning the respective at least one subordinate element at a position corresponding to a hierarchical level of the respective category being replaced.

10. A navigation device, comprising:
an input unit;
an output unit; and
an arithmetic logic unit for executing a computer program to implement a method for inputting a destination, the method including, for a hierarchical set of items that includes (a) a plurality of superordinate categories, and (b), for each of at least one of the superordinate categories, at least one respective subordinate element that is at a hierarchical level immediately below the respective superordinate category, performing the following:
for each of the at least one of the superordinate categories, conditional upon that the at least one respective subordinate element, that is of the respective superordinate category and that is at the hierarchical level immediately below the respective superordinate category, does not include more than a predefined first threshold number of subordinate elements, replacing the respective superordinate category with its at least one respective subordinate element that is at the hierarchical level immediately below the respective superordinate category, wherein the subordinate elements replacing their respective superordinate category are selectable destinations; and subsequently, in response to a selection of a category of the hierarchical set of items, which selected category is an immediate superordinate of at least one of the superordinate categories for which the replacement was performed, displaying the selectable destinations that replaced the at least one of the superordinate categories instead of the at least one of the superordinate categories.

* * * * *

UNITED STATES PATENT AND TRADEMARK OFFICE
CERTIFICATE OF CORRECTION

PATENT NO.        : 8,583,359 B2                                                        Page 1 of 1
APPLICATION NO. : 12/302336
DATED             : November 12, 2013
INVENTOR(S)       : Walkling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 666 days.

Signed and Sealed this
Twenty-second Day of September, 2015

Michelle K. Lee
*Director of the United States Patent and Trademark Office*